Feb. 15, 1938.   H. PAXTON   2,108,548
LIDDING MACHINE
Filed April 24, 1935    4 Sheets-Sheet 1
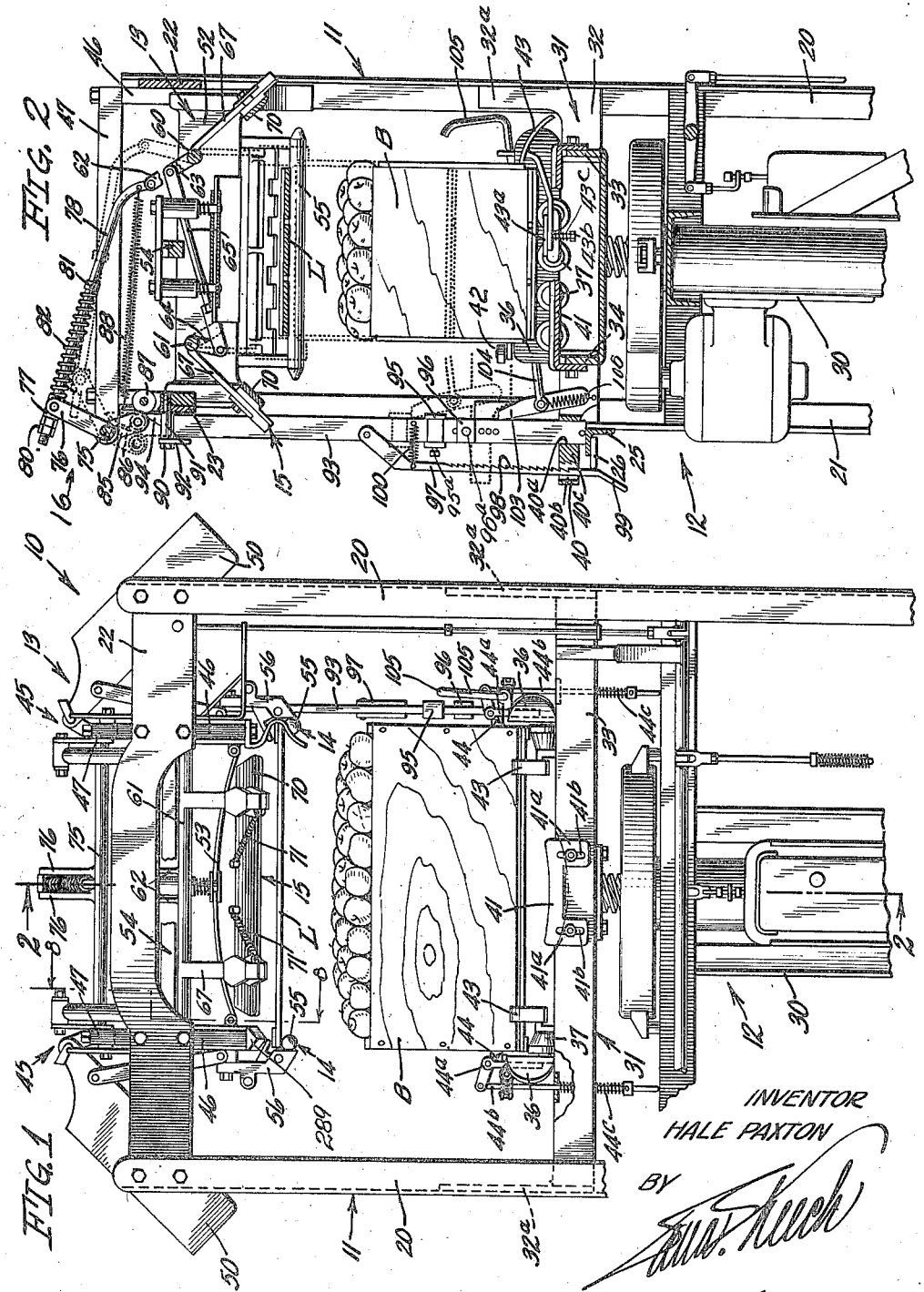
INVENTOR
HALE PAXTON
BY
ATTORNEY

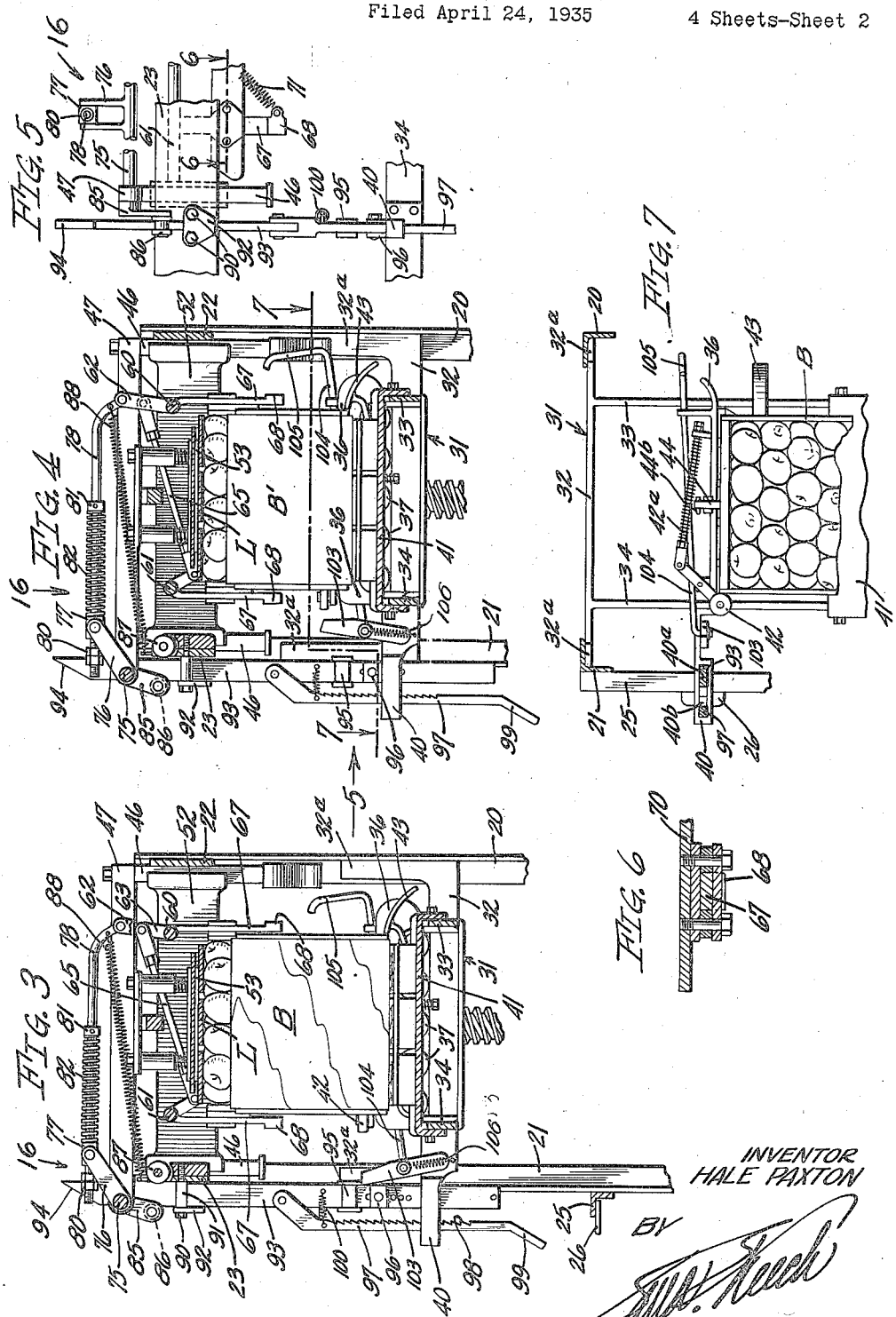

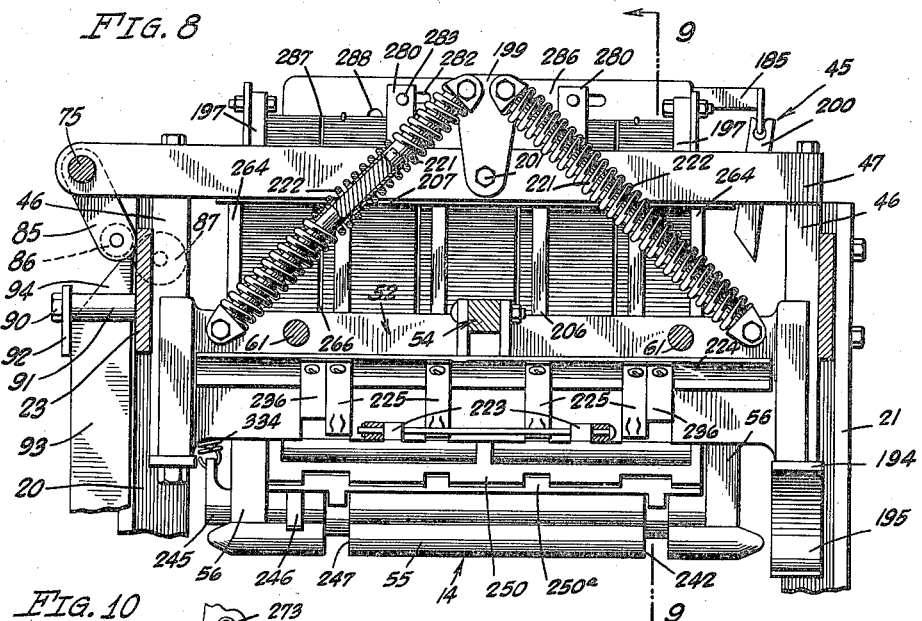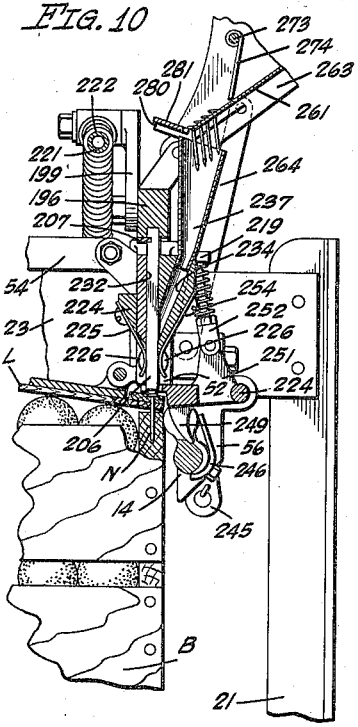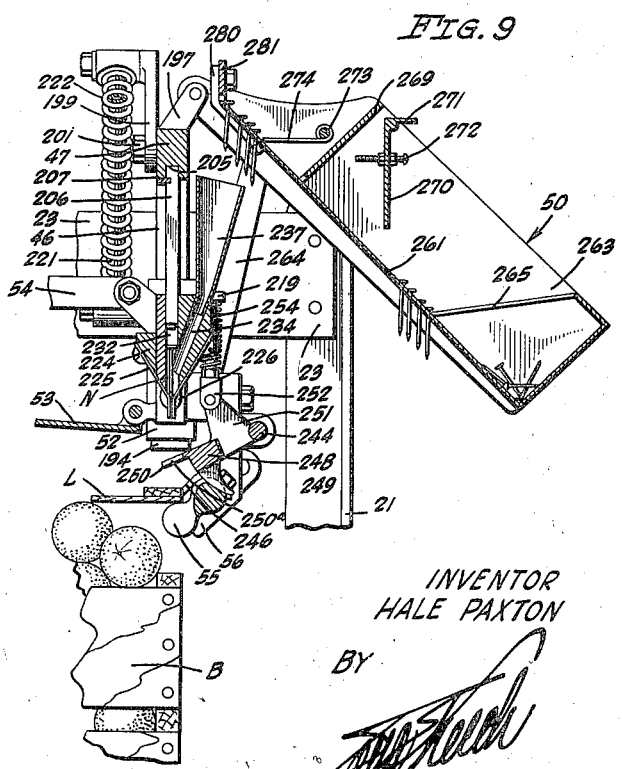

Feb. 15, 1938.   H. PAXTON   2,108,548
LIDDING MACHINE
Filed April 24, 1935   4 Sheets-Sheet 4

INVENTOR
HALE PAXTON
BY
ATTORNEY.

Patented Feb. 15, 1938

2,108,548

UNITED STATES PATENT OFFICE 2,108,548

LIDDING MACHINE

Hale Paxton, Santa Ana, Calif., assignor, by mesne assignments, to Food Machinery Corporation, a corporation of Delaware Application April 24, 1935, Serial No. 17,968

22 Claims. (Cl. 1—10)

My invention relates to packing of agricultural produce for shipment and has particular reference to machines for applying lids to boxes.

Certain fruits, such as apples, are packed in two different sized containers known as full and half boxes which are of equal lengths and widths and differ only in height. These boxes are overfilled so that the top layer of fruit is often disposed above the top of the box with the outer rows of fruit of the top layer partially overlying the upper edges of the sides and ends of the box. In applying a lid to these overfilled boxes, it is necessary to tuck the overlying fruit inward from over the upper edges of the box and arch the lid until the ends thereof contact the ends of the box. The lid ends are then nailed to the box and the pressure exerted on the fruit by the arched lid prevents the fruit from becoming loose from shrinkage during shipment.

An object of my invention is to provide such a machine having mechanism for tucking the contents inward when the machine is applying lids to boxes of different heights.

Another object of my invention is to provide a machine for lidding boxes of different heights in which the tucking mechanism can be readily adjusted to accommodate whatever height of box is delivered thereto.

A further object of my invention is to provide such a machine in which the box is positively separated vertically from the overhead mechanism of the machine.

Other objects and advantages will become apparent in the following description taken in connection with the accompanying drawings in which:

Fig. 1 is a fragmentary, front elevational view of a preferred embodiment of my invention.

Fig. 2 is a vertical sectional view taken on the line 2—2 of Fig. 1.

Fig. 3 is a view similar to Fig. 2, showing the manner in which the machine operates on a full size box.

Fig. 4 is a view similar to Fig. 3, showing the manner in which the machine operates on a half size box.

Fig. 5 is a fragmentary rear elevational view looking in the direction of the arrow 5 of Fig. 4.

Fig. 6 is an enlarged horizontal sectional view taken on the line 6—6 of Fig. 5.

Fig. 7 is a fragmentary sectional detail view taken on the line 7—7 of Fig. 4.

Fig. 8 is an enlarged transverse sectional view taken on line 8—8 of Fig. 1.

Fig. 9 is a longitudinal sectional view taken on the line 9—9 of Fig. 8.

Fig. 10 is a view similar to Fig. 9 illustrating the culmination of a nail driving operation of the nailing mechanism in nailing the lid to the box.

Figure 12:
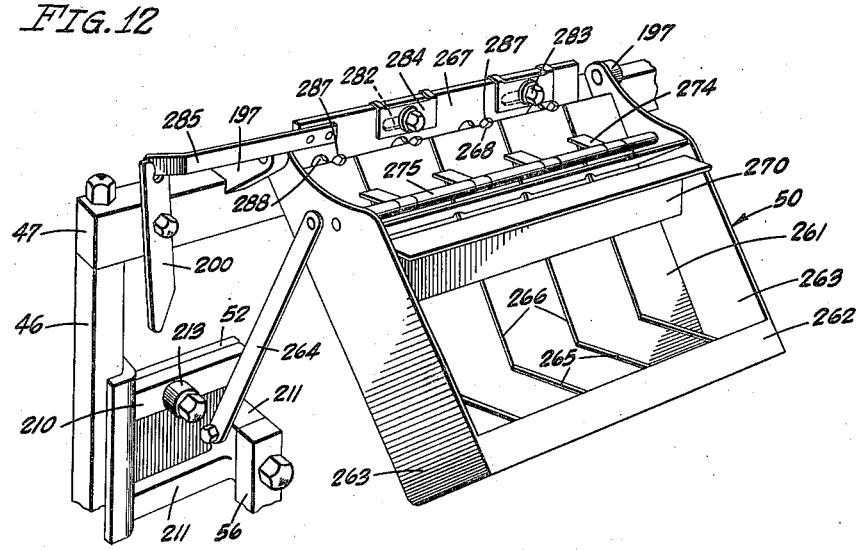
Fig. 12 is a perspective view of the nail hopper which is provided upon each of the nailing units of my invention.

Referring specifically to the drawings, a box lidding machine 10, comprising a preferred embodiment of my invention, is shown in Fig. 1. This machine includes a frame 11, elevator 12, nailing mechanism 13, end tuckers 14, side flushers 15 and a suitable mechanism 16 for operating the side flushers 15. The machine 10, with exception of the elevator 12, the side flushers 15, and the mechanism 16 is substantially similar to the lidding machine disclosed in the co-pending application of Hale Paxton et al., Serial No. 688,104, filed September 15, 1933. The frame 11, nailing mechanism 13 and end tuckers 14 will be but briefly described herein as a more complete description of these units may be had by reference to the above identified application.

The frame 11 includes front and rear pairs of corner posts 20 and 21, to the upper ends of which front and rear plates 22 and 23 respectively are fixed. Mounted on the rear posts 20 is a horizontal angle iron bar 25 to which a rearward extending finger 26 is fixed as shown in Fig. 2.

The elevator 12 includes an electrically driven power unit 30, and a box supporting table 31. The table 31 is slidable vertically in the frame 11 and is adapted to be raised or lowered by the power unit 30 at the will of the operator.

The table includes a bar 32 positioned at each side of the machine 10, the ends of the bars 32 having erect guide legs 32a rigidly formed thereon and disposed in sliding relation with the corner posts 20 and 21. Welded to the bars 32 are front and rear bars 33 and 34 respectively. Mounted on the bars 33 and 34 are box conveyor plates 36 on which are mounted box supporting rollers 37. Fixed on the rear bar 34 of the table 31 (Fig. 3) is a rearward extending bracket 40 which is formed as shown in Fig. 7 to provide a pair of vertical openings 40a and 40b, these being separated by a block 40c, the latter having a ratchet toothed face as shown in Fig. 2. The purpose of the bracket 40 will be made clear hereinafter.

Supported on the bars 33 and 34 is a box bottom curvature plate 41 having legs 41a which are adjustably secured to said bars by cap screws which extend through slots 41b therein. This permits vertical adjustment of the plate 41 relative to the bars 33 and 34 to the box supporting rollers 37.

Carried by the conveyor plate 36 are rear box stops 42 and mounted on the spindles of the rollers 37 are front box stops 43. The stops 42 are rollers mounted on vertical axes to be pressed by springs 42a into the path of a box travelling rearward on the conveyor rollers 37, the springs 42a yielding and permitting the box to be discharged rearward from the table 31 when the box is forcibly pushed against the roller stops 42.

The front box stops 43 are spring mounted on angle iron brackets 43a which are fixed upon inner ends of the spindles which also carry the conveyor rollers 37. This is accomplished by bolts 43b (Fig. 2) which extend up through loose holes in the stops 43 and screwed into threaded holes in brackets 43a. Springs 43c coiled about bolts 43b yieldably hold stops 43 in their upward positions.

Also carried by the table 31 are box hold down dogs 44, these being pivotally supported on bifurcated brackets 44a and connected pivotally with push rods 44b which are urged downward by springs 44c. When the table is lowered (see Figs. 1 and 2), rods 44b engage the frame 11 and rock dogs 44 out of the path of any box resting in or passing into or from said table.

The nailing mechanism 13 consists of a pair of identical units 45 (Figs. 1 and 8). Each of the units 45 includes vertical slide bars 46 mounted on the plates 22 and 23. Mounted on the upper ends of the slide bars 46 are bars 47, the latter being apertured at their rear extremities for a purpose to be explained hereinafter. Hinged to the bars 47 at each side of the machine 10 are nail hoppers 50. Slidable vertically on each pair of the vertical bars 46 is a chuck beam 52. Hinged to the beams 52 is a crown sheet 53, which is yieldably held at the middle by spring means 54 also mounted on the chuck beams 52.

The end tuckers 14 include round bars 55 which are pivotally mounted on suitable brackets 56, the latter being fixed to the chuck beams 52 as shown in Figs. 1, 9, and 10.

The side flushers 15 include front and rear shafts 60 and 61, respectively, these being journalled at their ends on the beams 52 of the nailing units 45. Welded to the center of the shaft 60 is a pair of upward extending levers 62 as seen in Figs. 1 and 2. Also welded on the shaft 60, at one end thereof, is a single upward extending lever 63 as shown in Fig. 3. Fixed to the shaft 61 (Fig. 2) is a downward extending lever 64 positioned in alignment with the lever 63 of the shaft 60. Connected to the levers 63 and 64 is a link 65. Extending downward and outward from the shafts 60 and 61 are pairs of tucker arms 67 having stop blocks 68 fixed on the ends thereof as seen in Fig. 3. Slidable on the arms 67 are side flusher plates 70, the latter being normally urged to their lowermost positions (see Figs. 1 and 2) by extension springs 71.

The side flusher operating mechanism 16 includes a shaft 75 rotatably mounted in the apertured rear extremities of the bars 47 as shown in Figs. 1 and 2. Welded to the center of the shaft 75 is a pair of upstanding levers 76, these being aligned with the aforementioned levers 62 of the shaft 61. Pivotally mounted between the ends of the levers 76 is an apertured block 77. Slidably received by the block 77 is one end of a rod 78, the opposite end of which is received between the extremities of the levers 62 of shaft 60. Mounted on the rod 78 are nuts 80, a collar 81, and a compression spring 82, the latter being disposed between the block 77 and collar 81 as shown in Fig. 2. Fixed on one end of the shaft 75, as shown in Fig. 5, is a downward extending lever 85 having a roller 86 mounted on the end thereof.

Rotatably mounted on the aforementioned rear plate 23 of the frame 11 is a roller 87 which is positioned in radial alignment with the roller 86 of the lever 85. The roller 86 is normally urged into contact with the roller 87 by an extension spring 88, the latter being fixed at its ends to the rod 77 and plate 23 as shown in Figs. 2 and 5. Mounted on and in spaced relation with the plate 23 as by bolts 90 and spacers 91 is a plate 92. Slidably received between the spacers 91 is a bar 93 positioned in vertical alignment with the rollers 86 and 87. The upper end of the bar 93 (Figs. 3 and 4) is beveled to provide a wedge 94, the lower end of the bar 93 extending through the opening 40a of the bracket 40 and normally resting on the bar 25 as shown in Fig. 2. Mounted on the bar 93 and adjustable vertically thereon are upper and lower blocks 95 and 96 respectively. Set screws 95a and 96a are provided on these blocks respectively to adjustably fix these blocks on bar 93.

Pivoted to the bar 93 above the block 95 is a withdrawal latch 97 formed to provide a toothed face 98. The latch 97 is normally received by the opening 40b of the bracket 40, the lower end of the bar being bent to provide an angular portion 99. Fastened at its ends to the bar 93 and latch 97 is an extension spring 100. Pivoted at its lower end to the bracket 40, as shown in Fig. 2, is a latch arm 103 positioned to contact the bar 93. Connected to the arm 103 is a control rod 104 having a handle 105 formed thereon. Connected to the arm 103 and the bracket 40 is an overthrow spring 106 adapted to maintain the arm 103 either in or out of contact with the bar 93.

As the nailing units 45 are substantially identical, a description of one of these will suffice for both. Referring particularly to Figs. 8 to 11 inclusive, each unit 45 has pins 191 provided in the side slide bar 46 (see Fig. 11) by which the unit may be supported upon the side plates 22 and 23 of the frame, these units commonly being mounted on the side plates 22 and 23 by cap screws 193 extending either through pairs of holes 180 or through pairs of holes 181 in the side plates 22 and 23 and being threadedly received in suitable holes provided in the side slide bars 46. Secured to lower ends of the side slide bars 46 are chuck beam stops 194 the front stop having a lid guiding member 195 secured thereon. Extending between and preferably rigidly connected at its opposite ends to the upper ends of the side slide bars 46 is the cross bar 47 previously mentioned, this bar having stripper supporting ears 197, an upwardly extending spring hanger 199, and a nail hopper operating cam lever 200 (Fig. 12) pivotally mounted thereon. The spring hanger 199 (Fig. 8) is connected to the cross bar 47 by a single cap screw 201.

Formed in the lower face of the cross bar 47 (Fig. 8) is a groove 205. Square nail drivers 206 have their upper ends held in place in the grooves 205 by a key 207 which extends into suitable notches provided in the drivers 206, the key 207 being secured in any suitable manner to the lower face of the cross bar 47. The chuck beam 52 is disposed between the side slide bars 46 said chuck beam having guide shoes 208 at its opposite ends which slidably receive the slide bars 46.

The chuck beam 52 is reinforced by welding blocks 210 along its upper edge and blocks 211 along its lower edge adjacent the guide shoes 33 and then by blocks 212 welded in spaced relation along the lower edge of the chuck beams. One of the blocks 210 at the front of the machine provides a mounting for a nail hopper cam actuating roller 213 secured to the guide shoe 208 at the front of the machine (see Fig. 11).

Figure 11:
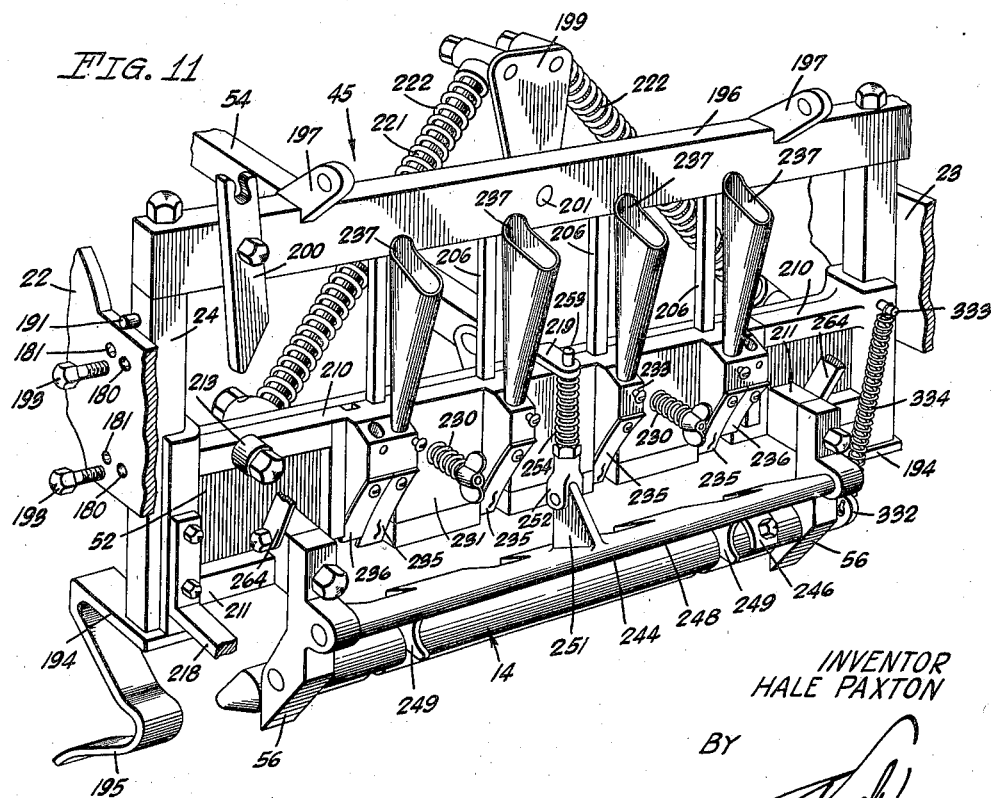
Fig. 11 is an enlarged perspective view of one of the nailing units of the nailing mechanism.

Provided on the upper end of the chuck beam 52 at the middle of the beam is a lid centralizer spring lug 219 (see Figs. 10 and 11). Pivotally mounted at their opposite ends on the spring hanger 199 and on opposite ends of the chuck beam 52 are telescopic spring spindles 221 on which heavy compression springs 222 are mounted under constant tension. Provided on the lower edge of the chuck beam 52 and extending inwardly therefrom is a pair of crown sheet attaching eyes 223 to which the crown sheet 53 is pivotally connected.

Formed on the chuck beam 52 and extending inwardly across its entire length is the chuck spring supporting bar 224, chuck springs 225 being secured by screws to an inclined lower face of this bar. The lower ends of the chuck springs 225 are bent to extend vertically downward and pockets 226 are formed in these springs preferably by pressing the material thereof outwardly.

Resting on top of the lower reinforcing blocks 212, disposed between the upper reinforcing blocks 210, and yieldably held against the chuck beam 52 by spring bolts 230 is a compound spring chuck block 231 which is clearly shown in Fig. 11. This block 231 has a plurality of driver guideways 232 (Figs. 9, 10 and 11) provided therein and a rearwardly extending boss 233 opposite each of these guideways, this boss providing a nail feeding duct 234 leading into the channel 232, and inwardly inclined faces against which chuck springs 235 are secured by screws. These springs are substantially identical with springs 225 (Fig. 19) and extend inwardly and downwardly to cooperate with the springs 225 in a manner which will be made manifest hereinafter.

In the preferred embodiment of my invention there are six guideways 232 shown in the compound chuck block 231, outermost pairs of these guideways being closer together than the inner pairs so that each of the outer pairs of bosses 233 are formed as a single unit. As shown in Fig. 11 only one of each of the outermost pairs of the guideways 232 is used, the purpose of these two guideways being disposed close together being to permit operation upon boxes differing considerably in width. When any of the guideways 232 is not used it has been found preferable to cover up its lower end as by short dummy chuck springs 236 secured both to the boss 233 and to the bar 224 opposite this guideway.

Removably supported in each of the ducts 234 and connected therewith is a nail funnel 237. The brackets 56 are mounted on the chuck beam reinforcing blocks 211 as clearly shown in Fig. 11, these brackets pivotally carrying the opposite ends of the end tucker 14 for this nailing unit, and a lid depresser and centralizer 244. The end tucker 14 normally extends downwardly at an angle as clearly shown in Fig. 9 so that it is adapted to support the end of a box lid as shown in Figure 1. Secured on the tucker 14 to provide a stop for the rear edge of such a lid is a cam member 246. Also formed in the tucker 14 as clearly shown in Figs. 8, 9, 10, and 11 is a pair of slots 247.

The lid depresser and centralizer 244 has a cross section as shown in Figs. 9 and 10 which includes a body 248 having arcuate guides 249 extending downwardly into the grooves 247 in the tucker 14, and a lip 250 which extends inwardly from the body 248 at the upper edge thereof and is provided with suitable notches 250a, one of these being opposite each of the nail driver guideways 232. The lid depresser and centralizer 244 has an upwardly extending hump 251 to which is pivotally secured a clevis 252 carrying a rod 253 which extends through a suitable aperture in the lug 219, a compression spring 254 being coiled about the rod 253, said spring constantly urging said lid depresser and centralizer 244 to rotate downwardly into the position in which it is shown in Figs. 9, 10, and 11.

Referring now particularly to Figs. 9, 10, and 12, it will be seen that each nailing unit 45 includes a nail hopper 50 having a floor 261, a rear wall 262 and side walls 263, the inner ends of the latter being pivotally connected to the hopper mounting lug 197. The hopper side walls are also connected by links 264 to the reinforcing block 211 of the chuck beam 52. Extending from the upper edge of the rear wall 262 to spaced points in the floor 261 are nail agitating rods 265, there being nail advancing slots 266 extending forwardly from these rods to a front edge 267 of the floor 261. Formed in the edge 267 adjacent each of the blocks 266 is a relatively small notch 268. The hopper has a fixed baffle wall 269 extending between the wall 263 and rigidly secured thereto, there being clearance between the lower edge of the wall 269 and the floor 261 adjacent the slots 266 to permit nail heads to pass underneath the baffle wall 269 as the stems of the nails extend through the blocks 266. Pivotally mounted between the walls 263 is a pivoted baffle 270, this baffle having a flange 271 at its upper end and a set screw 272 for limiting its downward swinging movement when the hopper 260 is extended upwardly. Also extending between the wall 263 is a rod 273 on which are pivotally mounted a series of traps 274, these being held in spaced relation by spacers 275. Each of the traps 274 is disposed over one of the slots 266. As shown in Fig. 8, a coil spring 286 attaches to one of the brackets 280 and to the picker bar 281 so as to constantly urge this picker bar into the position in which it is shown in Figs. 8 and 12.

The picker bar 281 has its lower edge both parallel and close to the front edge 267 of the picker floor 261, and this edge of the picker bar is provided both parallel and close to the front edge 267 of the hopper floor 261 and this edge of the picker bar is provided with a series of notches one pair for each of the slots 266 of the hopper floor. Each of these pairs of notches comprises a small notch 287 and a large notch 288. The notch 287 of each of these pairs being opposite one of the notches 268 when the picker bar is pictured as shown in Fig. 12, while the large notch 288 of that bar is on the opposite side of that notch 268 from the slot 266 adjacent that notch 268. The notches 287 and 288 are spaced apart the same distance from their centers as is each of the slots 266 and adjacent notch 268.

Each end tucker 14 (Fig. 11) has an arm 332 which is connected to a lug 333 on the chuck beam 52 by a contractile spring 334.

I have now completed a description of the right hand nailing unit 45 as shown in Fig. 1. The left hand nailing unit 45 is an exact duplicate of the one hereinabove described, excepting that instead of a hook 195 being formed on the forward chuck beam stop 194, the corresponding chuck beam stop on the left hand nailing unit 45 merely has a shallow V-shaped lid end guide 289 as shown in Fig. 1.

*Operation*

In lidding boxes on the machine 10, the box is rolled onto the table 31 from the front, the front stops 43 yielding downward to permit the box to pass over these. The box then comes to rest against the rear stop rollers 42 and the front stops rise up to trap the box in position for lidding.

The lidding operation is accomplished by lifting the table 31 to press the box on the table against the apparatus overhead and then returning the table downward. The function of the box hold down dogs 44 is to positively keep the box in place on the table 31 during the lidding of the box. Normally the dogs 44 are swung down out of the path of the box when it is travelling over the rollers 37. As the table lifts in commencing a lidding operation, however, the rods 44b are freed from restraint by the frame 11 and are thereupon urged downward by the springs 44c which swings the dogs 44 up into biting relation with ends of the box resting on the table 31. The box is thus held in position on the table until the latter returns downward and engagement of the rods 44b with the frame 11 swings the dogs 44 into inactive positions as shown in Fig. 1.

After the box B has been properly positioned in the lidding machine 10 for the purpose of lidding this box it appears as shown in Fig. 1. The elevator mechanism 12 is now energized to lift the table 31 and the box B thereon directly upward. As the table 31 continues to rise, the fruit in the box comes in contact with the lid L, as shown in Fig. 9. This lifts the lid L against the lid centralizer lip 250 and swings the centralizer 248 upwardly until the lip 250 rests against the lower faces of the chuck beams 52. While this is happening, the ends of the box rise into engagement with the end tuckers 14 and rock the latter inwardly to tuck any fruit overhanging the edges of the box inwardly so that when this fruit engages the cover it is pressed down inside the box. The upward movement of the box then rocks the end tuckers outwardly from between the ends of the box and the ends of the lid, this occurring just as the lid end presses the lid centralizer lips 250 up against the chuck beams 52. The ends of the lid are now pressed against the ends of the box and the middle portion of the lid is in conformation with the crown sheet 53 as shown in Fig. 10, but the crown sheet and chuck beams 52 and parts associated therewith are still in their lowermost positions as shown in Fig. 9.

When the lid ends have thus been completely pressed against the ends of the box, the continued upward movement of the box B lifts the chuck beams 52, further compressing the springs 222 and causing the drivers 206 to drive nails disposed in the recesses 232 downwardly from between the chuck spring 225 and 235 through the lid ends, and into the ends of the box, as clearly shown in Fig. 10. In the embodiment of the invention disclosed, the nails N and drivers 206 do not move downwardly but remain stationary while the box and lid are impaled upwardly upon the nails.

The machine 10 of my invention is designed to lid either a high or a low box. When a high box is to be lidded, such as the box B shown in Figs. 1, 2 and 3, the box is rolled onto the table 31 and a lid L is slid into position on the end tucker bars 55. The rod 104 is pushed leftward as viewed in Fig. 2 by the operator so that the dog 103 contacts the bar 93. The power unit 30 is then energized by the operator causing the table 31 to be raised. When the table 31 has risen a predetermined distance, the latch arm 103 engages the upper block 95 of the bar 93 causing the latter to be raised with the table 31. The wedge 94 on the upper end of the bar 93 is forced between the rollers 86 and 87 causing the shaft 75 to be rotated. The rod 78 and link 65 cause the shafts 60 and 61 to be rotated thus swinging the flusher arms 67 inward to the dotted line position in which they are shown in Fig. 2.

The block 95 is properly adjusted on the bar 93 to cause the mechanism 16 to swing the flusher arms 67 inward to a vertical position at the instant the box B has been raised to the dotted line position shown in Fig. 2, it being noted that the upper edges of the box sides are slightly below the lower edges of the flusher plates 70. In thus swinging into vertical position, the flusher plates 70 move the fruit overlying the upper edges of the box sides inward from over these edges, this action taking place before a substantial pressure is exerted on the fruit by the lid L. While the side flushers 15 are being thus actuated, the end tuckers 14 tuck the fruit inward from over the upper edges of the ends of the box B. The manner in which the end tuckers function is clearly set forth in the above referred to co-pending application.

After the side flushers 15 are swung inward to the dotted line positions in which they are shown in Fig. 3, the upward movement of the box causes the upper edges of the box sides to engage and lift the flusher blades 70. This lifting of blades 70 with the latter sliding upward on the tucker arms 67 continues until the box has risen to the point where the lid ends are compressed between the ends of the box and the chuck beams 52 as described in said copending application. At this point the chuck beams 52 start to be lifted by the upward pressure of the box and lid ends thereagainst and all the parts mounted on the chuck beams are lifted with the latter. Such parts include the crown sheet 53, its yieldable support structure 54, shafts 60 and 61, and the arms 62, 63 and 67 carried by these shafts. The chuck beams and said parts mounted thereon and the side flusher plates 70 are now merely riding upward with the box and nailing table 31, all at the same rate of rise, so that no further relative vertical movement takes place between the elements thus rising, during the balance of the rising movement in which the nails are driven by nail drivers (not shown) on the bars 47 from nail chucks (not shown) on the beams 52 these nails passing through the lid ends and into the ends of the box. Fig. 3 illustrates the aforesaid elements at the upper terminus of said rising movement. The mechanics of the nailing operation here just completed is described in the aforesaid copending application.

The latch 97 is for the purpose of assuring downward withdrawal of the cam bar 93 from between rollers 86 and 87, and becomes effective to lock bar 93 to block 40c as soon as latch 97 is lifted out of contact with the finger 26 (see Figs. 2 and 3). Such locking causes the bar 93 to be pulled downward by the table 31 when the latter is lowered, the latch 97 being disengaged from block 40c when it again strikes finger 26.

With the return downward of the table 31, the tuckers 15, the operating mechanism 16 therefor, and the hold down dogs 44 revert to the condition shown in full lines in Figs. 1 and 2, and box B, now lidded, is ready to be discharged from the machine. This is accomplished by the operator pushing rearwardly on the box B to spread the rear box stops 42 and permit the box to roll from the back of the machine 10 onto a suitable conveyor arranged there to receive it.

The box bottom curvature plate 41 is adapted to be adjusted vertically to determine the downward expansion permitted by the box bottom in the lid pressing operation.

If the next box to be lidded is a low or half box B' as shown in Fig. 4, the operator pulls on the rod 104 by grasping the handle 105 so that the dog 103 is swung to the position in which it is shown in Fig. 4. The operation of the machine 10 in lidding the half box B' is substantially the same as when lidding the box B excepting that the bar 93 is raised by contact of the bracket 40 with the block 96 rather than by contact of arm 103 with the upper block 95 as afore described. This allows the table 31 to rise a greater distance before the side flushers 15 are actuated, thus causing the half box B' to be raised in proper timely relation with the side flushers 15.

Although I have shown and described but one preferred embodiment of my invention, it is to be understood that various modifications and changes might be made therein without departing from the spirit of the invention or the scope of the appended claims.

What I claim is:

1. In a lid nailing machine for lidding overfilled packed boxes the combination of: a frame; a nailing table supported on said frame for receiving an overfilled packed box; a pair of nailing units mounted on said frame in spaced relation with each other over said nailing table, each of said units including a cross bar, a plurality of drivers mounted on said cross bar and extending downwardly therefrom, a chuck beam disposed beneath said cross bar, a plurality of nail chucks provided on said chuck beam in alignment with said drivers, means for supporting said cross bar on said frame, and means for supporting said chuck beam so as to be spaced downwardly from said cross bar and so as to be vertically slidable; mechanism on said frame for causing relative vertical movement between said nailing units and said table to bring said chuck beams into contact with opposite ends of a lid placed over said box until the opposite ends of said lid have been pressed against the opposite ends of said box, thereby arching said lid over the contents of said overfilled box, said relative movement then continuing between said table and said cross bars to cause said nail drivers to extend into said chucks to drive nails therefrom through said lid ends and into said box ends; gathering means carried by said chuck beams for gathering produce inwardly from over a vertical wall of said box to prevent said produce being pinched between said box and said lid; and means automatically operating in timed relation with said relative vertical movement to shift said gathering means inwardly, from a position located away from over said box, to a position extending inward over a vertical wall of said box to accomplish the gathering function as aforesaid.

2. In a lid nailing machine for lidding overfilled packed boxes the combination of: a frame; a nailing table supported on said frame for receiving an overfilled packed box; a pair of nailing units mounted on said frame in spaced relation with each other over said nailing table, each of said units including a cross bar, a plurality of drivers mounted on said cross bar and extending downwardly therefrom, a chuck beam disposed beneath said cross bar, a plurality of nail chucks provided on said chuck beam in alignment with said drivers, means for supporting said cross bar on said frame, and means for supporting said chuck beam so as to be spaced downwardly from said cross bar and so as to be vertically slidable; mechanism on said frame for causing relative vertical movement between said nailing units and said table to bring said chuck beams into contact with opposite ends of a lid placed over said box until the opposite ends of said lid have been pressed against the opposite ends of said box, thereby arching said lid over the contents of said overfilled box, said relative movement then continuing between said table and said cross bars to cause said nail drivers to extend into said chucks to drive nails therefrom through said lid ends and into said box ends; gathering means carried by said chuck beams for gathering produce inwardly from over a vertical wall of said box to prevent said produce being pinched between said box and said lid; and means independent of said box and actuated by the aforesaid mechanism in timed relation to said relative vertical movement to shift said gathering means inwardly to accomplish the function thereof as aforesaid.

3. A combination as in claim 1 in which the means last recited performs its shifting function when said relative movement has caused the approach of said chuck beams and the top of a box resting on said table to a given spaced relation and causes said gathering means to perform its function as aforesaid at a level close above the upper edge of said wall.

4. In combination as in claim 1 in which the means last recited performs its shifting function when said relative movement has caused the approach of said chuck beams and the top of a box resting on said table to a given spaced relation and causes said gathering means to perform its function as aforesaid at a level close above the upper edge of said wall; and means for selectively predetermining the time of operation of said shifting means in the lidding cycle in accordance with the height of the box to be lidded.

5. In a lid nailing machine for lidding overfilled packed boxes the combination of: a frame; a nailing table supported on said frame for receiving an overfilled packed box; a pair of nailing units mounted on said frame in spaced relation with each other over said nailing table, each of said units including a cross bar, a plurality of drivers mounted on said cross bar and extending downwardly therefrom, a chuck beam disposed beneath said cross bar, a plurality of nail chucks provided on said chuck beam in alignment with said drivers, means for supporting said cross bar on said frame, and means for supporting said chuck beam so as to be spaced downwardly from said cross bar and so as to be vertically slidable; mechanism on said frame for causing relative vertical movement between said nailing units and said table to bring said chuck beams into contact with opposite ends of a lid placed over said box until the opposite ends of said lid have been pressed against the opposite ends of said box, thereby arching said lid over the contents of said overfilled box, said relative movement then continuing between said table and said cross bars to cause said nail drivers to extend into said chucks to drive nails therefrom through said lid ends and into said box ends; a gathering member carried by said chuck beams; and means automatically shifting said member inwardly over the upper edge of a side wall of said box in timed relation with said relative movement to gather produce inwardly to prevent its being pinched between said wall and said lid.

6. In a lid nailing machine for lidding overfilled packed boxes the combination of: a frame; a nailing table supported on said frame for receiving an overfilled packed box; a pair of nailing units mounted on said frame in spaced relation with each other over said nailing table, each of said units including a cross bar, a plurality of drivers mounted on said cross bar and extending downwardly therefrom, a chuck beam disposed beneath said cross bar, a plurality of nail chucks provided on said chuck beam in alignment with said drivers, means for supporting said chuck beam so as to be spaced downwardly from said cross bar and so as to be vertically slidable; mechanism on said frame for elevating said table with a box resting thereon and a lid positioned over said box to force said lid and box upwardly against said chuck beams, spring the ends of said lid downwardly against the ends of said box thereby arching said lid over the contents of said box, the elevation of said table then continuing so as to lift said chuck beams and to cause said nail drivers to extend into said chucks to drive nails therefrom through said lid ends and into said box ends; gathering means carried by said chuck beams and movable inwardly for gathering produce inward from over a vertical wall of said box to prevent said produce being pinched between said box and said lid in said lid pressing operation, said gathering means then travelling upwardly with said chuck beams during the lid nailing operation; and means automatically operating in timed relation with said relative vertical movement to shift said gathering means inwardly, from a position located away from over said box, to a position extending inward over a vertical wall of said box to accomplish the gathering function as aforesaid.

7. In a lid nailing machine for lidding overfilled packed boxes the combination of: a frame; a nailing table supported on said frame for receiving an overfilled packed box; a pair of nailing units mounted on said frame in spaced relation with each other over said nailing table, each of said units including a cross bar, a plurality of drivers mounted on said cross bar and extending downwardly therefrom, a chuck beam disposed beneath said cross bar, a plurality of nail chucks provided on said chuck beam in alignment with said drivers, means for supporting said cross bar on said frame, and means for supporting said chuck beam so as to be spaced downwardly from said cross bar and so as to be vertically slidable; mechanism on said frame for elevating said table with a box resting thereon and a lid positioned over said box to force said lid and box upwardly against said chuck beams, spring the ends of said lid downwardly against the ends of said box thereby arching said lid over the contents of said box, the elevation of said table then continuing so as to lift said chuck beams and to cause said nail drivers to extend into said chucks to drive nails therefrom through said lid ends and into said box ends; a gathering member carried by said chuck beams; and means automatically shifting said member inwardly over the upper edge of a side wall of said box in timed relation with said relative movement to gather produce inwardly to prevent its being pinched between said wall and said lid, said gathering member then travelling upwardly with said chuck beams during the lid nailing operation.

8. A combination as in claim 7 in which the means last recited performs its shifting function when said relative movement has caused the approach of said chuck beams and the top of a box resting on said table to a given spaced relation and causes said gathering means to perform its function as aforesaid at a level close above the upper edge of said wall.

9. In a lid nailing machine for lidding overfilled packed boxes the combination of: a frame; a nailing table supported on said frame for receiving an overfilled packed box; a pair of nailing units mounted on said frame in spaced relation with each other over said nailing table, each of said units including a cross bar, a plurality of drivers mounted on said cross bar and extending downwardly therefrom, a chuck beam disposed beneath said cross bar, a plurality of nail chucks provided on said chuck beam in alignment with said drivers, means for supporting said cross bar on said frame, and means for supporting said chuck beam so as to be spaced downwardly from said cross bar and so as to be vertically slidable; mechanism on said frame for causing relative vertical movement between said nailing units and said table to bring said chuck beams into contact with opposite ends of a lid placed over said box until the opposite ends of said lid have been pressed against the opposite ends of said box, thereby arching said lid over the contents of said overfilled box, said relative movement then continuing between said table and said cross bars to cause said nail drivers to extend into said chucks to drive nails therefrom through said lid ends and into said box ends; and gathering means carried on said chuck beams for gathering overflow produce inwardly from over end and side walls of said box to prevent said produce being pinched between said box and said lid.

10. In a lid nailing machine for lidding overfilled packed boxes the combination of: a frame; a nailing table supported on said frame for receiving an overfilled packed box; a pair of nailing units mounted on said frame in spaced relation with each other over said nailing table, each of said units including a cross bar, a plurality of drivers mounted on said cross bar and extending downwardly therefrom, a chuck beam disposed beneath said cross bar, a plurality of nail chucks provided on said chuck beam in alignment with said drivers, means for supporting said cross bar on said frame, and means for supporting said chuck beam so as to be spaced downwardly from said cross bar and so as to be vertically slidable; mechanism on said frame for elevating said table with a box resting thereon and a lid positioned over said box to force said lid and box upwardly against said chuck beams, spring the ends of said lid downwardly against the ends of said box thereby arching said lid over the contents of said box, the elevation of said table then continuing so as to lift said chuck beams and to cause said nail drivers to extend into said chucks to drive nails therefrom through said lid ends and into said box ends; and gathering means carried on said chuck beams for gathering overflow produce inwardly from over end and side walls of said box to prevent said produce being pinched between said box and said lid, said gathering means then travelling upwardly with said chuck beams during the lid nailing operation.

11. A combination as in claim 9 in which relative vertical separation between said nailing units and said table is accomplished by said mechanism following the completion of the lidding operation described in said claim; and means for holding said box against vertical separation from said table during the aforesaid separation between said nailing units and said table.

12. A combination as in claim 10 in which said mechanism causes a lowering of said table following the completion of the lidding operation described in said claim; and means for gripping said box to prevent said box separating from said table during the lowering of the latter.

13. In combination: a frame; a table supported on said frame for receiving an overfilled packed box; a presser head mounted on said frame in spaced relation with and disposed over said table; mechanism on said frame for causing relative vertical movement between said table and said presser head for pressing upwardly-heaped product downwardly into said box; gathering means mounted on said presser head for gathering inwardly edge portions of said heaped up product to prevent the pinching of the latter when depressed by said presser head; power transmission means for utilizing power from the aforesaid relative movement means to operate said gathering means to function on boxes of either of two heights; shiftable control means for controlling said power transmission means; and means for manually actuating said control means to selectively prepare said power transmission means to cause said gathering means to properly operate on one or the other of said boxes.

14. A combination as in claim 13 in which said shiftable control means is mounted on said table.

15. A combination as in claim 13 in which said shiftable control means and said manual actuating means are both mounted on said table.

16. A combination as in claim 13 in which said relative movement causing means elevates said table towards said presser head in order to press the contents of said box downwardly therein, said shiftable control means and manual actuating means being mounted on said table.

17. A combination as in claim 13 in which means is provided for adjustably determining, in advance, what the respective heighths of the gathering means above the table shall be at the times said power transmission means shall cause said gathering means to properly operate for the different respective settings of said shiftable control means.

18. A combination as in claim 13 in which said power transmission means comprises a cam bar disposed in upright position adjacent said table and said presser head; and a dog adjustably mounted on said cam bar and engageable by said shiftable control means, the adjustment of said dog on said cam bar determining in advance the height said gathering means will be above said table when later caused to operate by said power transmission means, said adjustment thus also determining in advance what height a box must be to be properly operated on by said gathering means.

19. In combination: a box receiving table; a frame structure disposed over said table; a presser head mounted on and slidable vertically relative to said overhead structure; means on said presser head for gathering overflow product inwardly from over the upper edges of the walls of a box on said table; means for causing relative vertical movement between said table and said overhead structure to cause said presser head to press heaped up product on said box downwardly therein; yieldable means for resisting relative vertical movement between said presser head and said overhead structure caused by the downward pressing of said product; means on said overhead structure for actuating said gathering means to gather inwardly said overflow product to prevent the pinching of the latter incident to the pressing of said product downwardly in said box as aforesaid; and means actuated by said relative movement causing means for operating the aforesaid means for actuating the gathering means.

20. A combination as in claim 19 in which said relative movement between said overhead frame structure and said table is accomplished by the elevation of said table.

21. A combination as in claim 19 in which said relative movement between said overhead frame structure and said table is accomplished by the elevation of said table, and in which the means last recited comprises a cam bar extending upwardly from said table to said overhead frame structure.

22. In combination: a table for supporting an over-filled box; a presser head disposed above said table; means for causing relative movement between said presser head and said table to apply pressure to the over-pack in said box to arch the same preparatory to lidding said box; a gathering member; means for moving said gathering member inward in timely relation with said pressing operation to gather edge portions of the over-pack inwardly from over a vertical wall of said box to prevent pinching of said edge portions incidental to said pressing operation; and means optionally operable prior to each pressing opeartion to predetermine selectively whether said gathering member when it is moved inwardly to perform its gathering function as aforesaid will be located at one height above said table so as to properly perform its gathering function on a box of a given standard height, or at a substantially different height above said table so as to properly perform its gathering function on a box, the height of which is substantially different than the aforesaid standard.

HALE PAXTON.